US008880557B2

(12) United States Patent
Takase

(10) Patent No.: US 8,880,557 B2
(45) Date of Patent: Nov. 4, 2014

(54) METHOD, PROGRAM, AND SYSTEM FOR DIVIDING TREE STRUCTURE OF STRUCTURED DOCUMENT

(75) Inventor: Toshiro Takase, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 13/154,823

(22) Filed: Jun. 7, 2011

(65) Prior Publication Data

US 2011/0320497 A1 Dec. 29, 2011

(30) Foreign Application Priority Data

Jun. 24, 2010 (JP) ................. 2010-143356

(51) Int. Cl.
*G06F 17/30* (2006.01)
(52) U.S. Cl.
CPC ............... *G06F 17/30327* (2013.01)
USPC ........................................................ 707/797
(58) Field of Classification Search
CPC ................................................ G06F 17/30327
See application file for complete search history.

(56) References Cited

U.S. PATENT DOCUMENTS

2007/0185845 A1* 8/2007 Nonomura ........................ 707/3

FOREIGN PATENT DOCUMENTS

| JP | 2002108844 A2 | 4/2002 |
| JP | 200727996 A | 10/2002 |
| JP | 2002312339 A | 10/2002 |
| JP | 2004524606 A | 8/2004 |
| JP | 2004287978 A | 10/2004 |
| JP | 20070193660 A2 | 8/2007 |
| JP | 2009064392 A | 3/2009 |
| WO | WO2005006192 | 1/2005 |

OTHER PUBLICATIONS

Wei Lu et al., "Parallel XML Processing by Work Stealing," High Performance Distributed Computing, Proceedings of the 2007 workshop on Service-oriented computing performance: aspects, issues, and approaches, 2007,pp. 31-38, ISBN: 978-1-59593-717-9.
Wei Lu et al., "A Parallel Approach to XML Parsing." International Conference on Grid Computing, Proceedings of the 7th IEEE/ACM International Conference on Grid Computing, 2006, pp. 223-230. ISBN: 1-4244-0343-X.
Yuntei Pan et al., "A Static Load-Balancing Scheme for Parallel XML Parsing on Multicore CPUs," CCGRID, Proceedings of the Seventh IEEE International Symposium on Cluster Computing and the Grid, 2007, pp. 351-362, ISBN: 0-7695-2833-3.
Tim Bray et al., "Extensible Markup Language (XML) 1.0 (Fifth Edition)," The World Wide Web Consortium (W3C), W3C Recommendation Nov. 26, 2008, URL:http://www.w3.org/TR/xml/.

(Continued)

*Primary Examiner* — Hosain Alam
*Assistant Examiner* — Johnese Johnson
(74) *Attorney, Agent, or Firm* — Tutunjian & Bitetto, P.C.; Jennifer R. Davis

(57) ABSTRACT

A method and system for dividing a tree structure of a structured document based on a tree structure defined by a schema of the structured document. The method includes the following steps: calculating an index value of size of a subtree having each element as a root for at least part of at least one element included in the tree structure defined by the schema, and deciding on a division pattern using the index value, where the division pattern is used to divide the tree structure of the structured document to which the schema is applied so that the size of the subtree, after being divided, meets a predetermined standard.

20 Claims, 10 Drawing Sheets

(56) References Cited

OTHER PUBLICATIONS

Henry S. Thompson et al., "W3C XML Schema Definition Language (XSD) 1.1 Part 1: Structures," The World Wide Web Consortium (W3C), W3C Working Draft Dec. 3, 2009, URL:http://www.w3.org/TR/xmlschema11-1/ (Retrieved Jun. 9, 2010).

David Peterson et al., "W3C XML Schema Definition Language (XSD) 1.1 Part 2: Datatypes." The World Wide Web Consortium, W3C Working Draft Dec. 3, 2009, URL:http://www.w3.org/TR/xmlschema11-2/ (Retrieved Jun. 9, 2010).

Yoshino, Y., et al., "A Data Placement and Access Method Considering Transversal and Result Construction Cost for XML Subtree Retrieval" Journal of the DBSJ, The Database Society of Japan, vol. 7, No. 1. Jun. 2008. pp. 115-120.

Kido, K., et al., "An Evaluation of a Scheme for Parallel Processing of XML Data using PC Clusters" IEICE Technical Report, The Institute of Electronics Information and Communication Engineers, vol. 106, No. 150. Jul. 2006. pp 127-132.

\* cited by examiner

```
<xs:element name="Root" type="tns:Root" />

<xs:complexType name="Root" >
  <xs:sequence>
    <xs:element name="C" type="tns:C" maxOccurs="unbounded" />
    <xs:element name="A" type="xsd:string" />
    <xs:element name="B" type="xsd:string" minOccurs="0" />
  </xs:sequence>
</xs:complexType>

<xs:complexType name="C" >
  <xs:sequence>
    <xs:element name="C1" type="xsd:int" maxOccurs="unbounded" />
  </xs:sequence>
</xs:complexType>
```

| ELEMENT NAME | COEFFICIENT | ELEMENT SIZE |
|---|---|---|
| Root | 1 | $e$ |
| A | 1 | $3e$ |
| B | 0.5 | $3e$ |
| C | 3 | $e$ |
| C1 | 3 | $1.5e$ |

| ABSOLUTE PATH OF ELEMENT | COEFFICIENT | ELEMENT SIZE |
|---|---|---|
| /Root | 1 | e |
| /Root/A | 1 | e |
| /Root/A/text() | 1 | 2e |
| /Root/B | 0.5 | e |
| /Root/B/text() | 1 | 2e |
| /Root/C | 3 | e |
| /Root/C[1]/C1 | 3 | e |
| /Root/C[1]/C1[1]/text() | 1 | 0.5e |
| /Root/C[1]/C1[2]/text() | 1 | 0.5e |
| /Root/C[1]/C1[3]/text() | 1 | 0.5e |
| /Root/C[2]/C1 | 3 | e |
| /Root/C[2]/C1[1]/text() | 1 | 0.5e |
| /Root/C[2]/C1[2]/text() | 1 | 0.5e |
| /Root/C[2]/C1[3]/text() | 1 | 0.5e |
| /Root/C[3]/C1 | 3 | e |
| /Root/C[3]/C1[1]/text() | 1 | 0.5e |
| /Root/C[3]/C1[2]/text() | 1 | 0.5e |
| /Root/C[3]/C1[3]/text() | 1 | 0.5e |

METHOD, PROGRAM, AND SYSTEM FOR DIVIDING TREE STRUCTURE OF STRUCTURED DOCUMENT

CROSS-REFERENCE TO RELATED APPLICATION

This application claims priority under 35 U.S.C. §119 from Japanese Patent Application No. 2010-143356 filed Jun. 24, 2010, the entire contents of which are incorporated herein by reference.

BACKGROUND

1. Field of the Invention

The present invention generally relates to information processing technology, and more particularly to a method, program, and system for dividing the tree structure of a structured document.

2. Related Art

Companies in the industry have developed techniques for processing structured documents. As the background art, for example, Japanese Patent Application Publication No. 2007-0279964 (Patent Ref. 1; Ref. 1) discloses an information search device including: block division means for dividing, based on a markup language, information including blocks as candidates for a search target into a required size of blocks; a storage medium on which multiple keywords unique in the field of the search target and values indicative of the frequency of occurrence of the target keywords are stored in pairs; scoring means for scoring each of the blocks based on a keyword used in each block and the information stored on the storage medium; and search target specifying means for specifying, as the search target, a block whose score falls within a predetermined range.

As another example of the background art, International Publication WO2005/6192 (Patent Ref. 2; Ref. 2) discloses a structured document processing method including: a structured document holding step for holding a structured document including tags intact as text in memory means; a document structure holding step for holding, in the memory means, document structure information on the structured document in association with the position of each tag in the structured document; and processing step for tracking a tree structure of the structured document according to the document structure information in response to a processing request to acquire information on elements in order to acquire part of the structured document based on the information acquired. The structured document holding step is to divide the structured document into a predetermined size of multiple divided portions to hold the structured document in the divided portions in order to absorb, at the boundary of any divided portions, changes in the size of the divided portions caused by updating the divided portions.

As still another example of the background art, Japanese Patent Application Publication No. 2007-0193660 (Patent Ref. 3; Ref. 3) discloses an information management device for managing information on a hierarchical tree structure of a storage device. This device includes: information storage means capable of storing a tree structure file describing, in a predetermined markup language, the information on the tree structure of the storage device; division determination means for determining whether to perform processing for dividing the tree structure file based on at least one of the state of the tree structure of the storage device and the processing power of the information management device; and control means for controlling the information storage means to keep the tree structure file stored in the information storage means when the division determination means determines that the processing for dividing the tree structure file is not performed, or when the division determination means determines that the processing for dividing the tree structure file is performed, to perform the processing for dividing the tree structure file to achieve a predetermined divided state including part of the tree structure so that the portions of the tree structure file divided by performing the division processing will be stored in the information storage means, respectively.

As yet another example of the background art, Japanese Patent Application Publication No. 2002-0108844 (Patent Ref. 4; Ref. 4) discloses an XML data division editing apparatus for editing and retrieving XML data, including means for analyzing input source XML data based on tags of the input source XML data and tag values to generate a tag list, and means for dividing the XML data using a main key target tag and division target tags selected from the tag list. When the XML data is divided in the XML data division editing apparatus, a main key index indicative of association between the value of the main key target tag and the divided XML data, and a division target tag tree structure in which values of the division target tags are hierarchized as tag values are crated.

Wei Lu et al., "Parallel XML Processing by Work Stealing," High Performance Distributed Computing, Proceedings of the 2007 workshop on Service-oriented computing performance: aspects, issues, and approaches, 2007, pp. 31-38, ISBN: 978-1-59593-717-9 (Non-patent Ref. 1; Ref. 5) discloses the background art as follows: "We present a parallel processing model for the XML document. The kernel of the model is a stealing-based dynamic load-balancing mechanism, by which multiple threads are able to process the disjointed parts of the XML document in parallel with balanced load distribution. The model also provides a novel mechanism to trace the stealing actions, thus the equivalent sequential result can be gotten by gluing the multiple parallel-running results together."

Wei Lu et al., "A Parallel Approach to XML Parsing," International Conference on Grid Computing, Proceedings of the 7th IEEE/ACM International Conference on Grid Computing, 2006, pp. 223-230, ISBN: 1-4244-0343-X (Non-patent Ref. 2; Ref. 6) discloses the background art as follows:

"This paper presents our design and implementation of parallel XML parsing. Our design consists of an initial preparsing phase to determine the structure of the XML document, followed by a full, parallel parse. The results of the preparsing phase are used to help partition the XML document for data parallel processing. Our parallel parsing phase is a modification of the libxml2 [1] XML parser, which shows that our approach applies to real-world, production quality parsers."

Yunfei Pan et al., "A Static Load-Balancing Scheme for Parallel XML Parsing on Multicore CPUs," CCGRID, Proceedings of the Seventh IEEE International Symposium on Cluster Computing and the Grid, 2007, pp. 351-362, ISBN: 0-7695-2833-3 (Non-patent Ref. 3; Ref. 7) discloses the background art as follows:

"We introduce a new static partitioning and load-balancing mechanism. By using a static, global approach, we reduce synchronization and load-balancing overhead, thus improving performance over dynamic schemes for a large class of XML documents. Our approach leverages libxml2 without modification, which reduces development effort and shows that our approach is applicable to real-world, production parsers."

Additional references disclosing background art are as follows:

Tim Bray et al., "Extensible Markup Language (XML) 1.0 (Fifth Edition)," The World Wide Web Consortium (W3C), W3C Recommendation 26 Nov. 2008, URL:http://www.w3.org/TR/xml/ (Retrieved Jun. 9, 2010) (Non-patent Ref. 4; Ref. 8).

Henry S. Thompson et al., "W3C XML Schema Definition Language (XSD) 1.1 Part 1: Structures," The World Wide Web Consortium (W3C), W3C Working Draft 3 Dec. 2009, URL: http://www.w3.org/TR/xmlschema11-1/(Retrieved Jun. 9, 2010) (Non-patent Ref. 5; Ref. 9).

David Peterson et al., "W3C XML Schema Definition Language (XSD) 1.1 Part 2: Datatypes," The World Wide Web Consortium, W3C Working Draft 3 Dec. 2009, URL:http://www.w3.org/TR/xmlschema11-2/(Retrieved Jun. 9, 2010) (Non-patent Ref. 6; Ref. 10).

The problem of reducing the processing efficiency of the structured document cannot be resolved by any of the aforementioned examples of the background art.

SUMMARY OF THE INVENTION

One aspect of the present invention is a computer-implemented method for dividing a tree structure of a structured document based on a tree structure defined by a schema of the structured document. The method includes the steps of: calculating an index value of size of a subtree having each element as a root for at least part of at least one element included in the tree structure defined by the schema, and deciding on a division pattern using the index value, where the division pattern is used to divide the tree structure of the structured document to which the schema is applied so that the size of the subtree, after being divided, meets a predetermined standard.

Another aspect of the present invention is a system for dividing a tree structure of a structured document based on a tree structure defined by a schema of the electronic structured document. The system includes: a calculation section for calculating an index value of size of a subtree having each element as a root for at least part of at least one element included in the tree structure defined by the schema, and a decision section for deciding on a division pattern using the index value, where the division pattern is used to divide the tree structure of the structured document to which the schema is applied so that the size of the subtree, after being divided, meets a predetermined standard.

BRIEF DESCRIPTION OF THE DRAWINGS

FIG. 8 shows an example of an XML schema in the embodiment of the present invention.

FIG. 9 shows an example of a coefficient table in the embodiment of the present invention.

FIG. 10 shows another example of the coefficient table in the embodiment of the present invention.

DETAILED DESCRIPTION OF THE PREFERRED EMBODIMENTS

Figure 1:
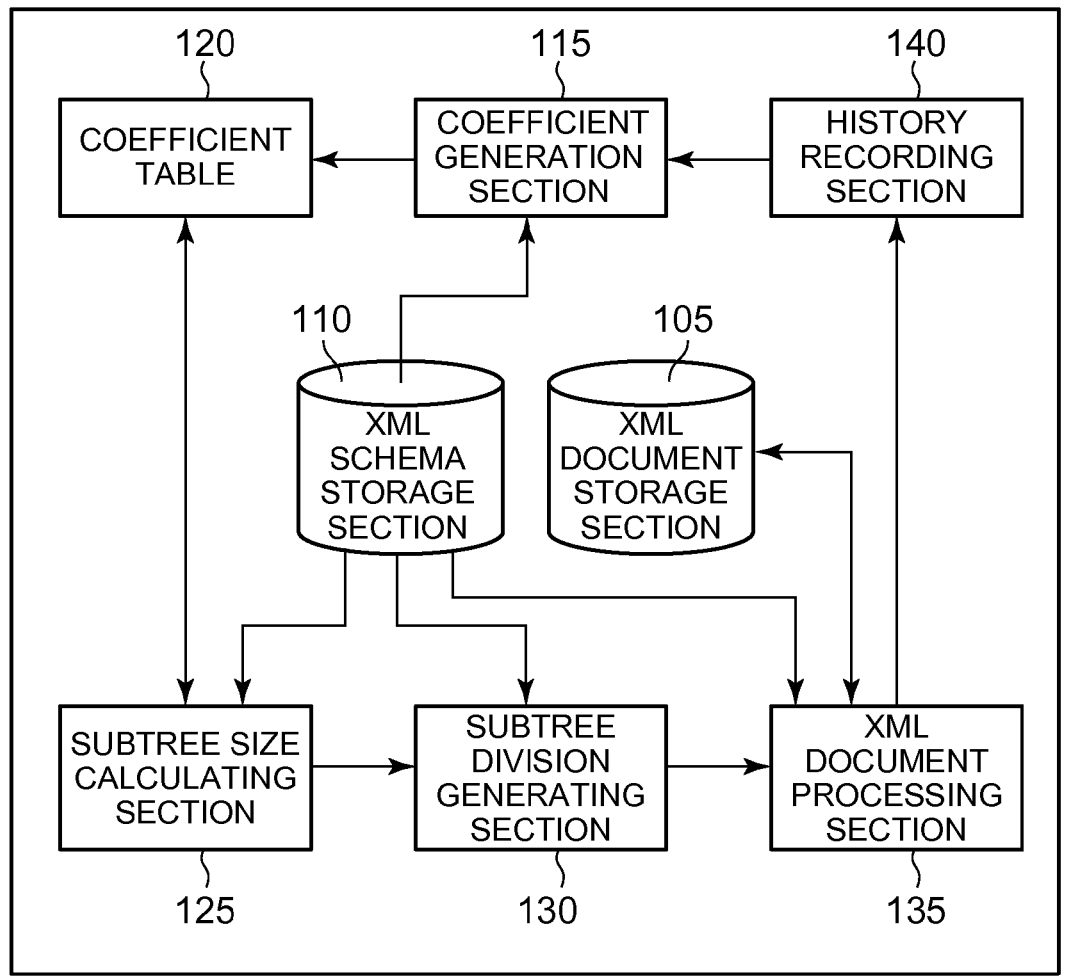
FIG. 1 is a functional block diagram of a data processing system according to a preferred embodiment of the present invention.

With the recent widespread use of computers, companies and individuals have created contents as electronic data, and exchanged or published them on the Internet on a regular basis. Many contents are created as computerized structured documents that conform to metalanguage formats such as SGML, HTML, XML, and XHTML, and these contents are processed on various computers. For such structured documents, schema data can be created to define the document structures of the structured documents in accordance with schema languages such as XML Schema, DTD, RELAX, RELAX NG, NVDL, and Schematron.

Further, in recent years, multi-core processors have become widespread, such as POWER® 7 processors available from International Business Machines Corporation (IBM), and these multi-core processors are used in many computers. In general, the multi-core processor has multiple cores (arithmetic units) operable in parallel. For example, when an XML document is processed on multi-cores, it is important to assign tasks to respective cores appropriately in order to improve processing efficiency.

In order to process a structured document such as a XML document efficiently, it can be desired to divide the tree structure of the structured document into a proper size of subtrees. For example, if the tree structure of the structured document is divided into subtrees of almost equal sizes and each subtree task is assigned to each core of the multi-core processor, the possibility that the task on each core will complete in an average time increases. As a result, more efficient parallel processing with reduced latency can be expected.

In order to divide the tree structure of the structured document, it can be considered a technique for scanning the structured document itself to explore the tree structure in order to divide the tree structure of the structured document. However, since the size of the structured document itself can be large, this technique requires a long time until completion of this scan, and hence the processing efficiency of the structured document can be reduced.

This problem of reducing the processing efficiency of the structured document cannot be resolved by the prior art.

Therefore, it is one object of the present invention to provide a system, software, and method for dividing the tree structure of a structured document effectively.

The best mode for carrying out the present invention will now be described in detail with reference to the accompanying drawings. It should be noted that the following embodiment does not limit the inventions described in the appended claims, and not all the combinations of features described in the embodiment are requisites as resolving means of the present invention.

Further, while the present invention is described below as the method for dividing a structured document, the present invention can also be understood as a program, a program product, software, a software product, and a method. For example, the program product or the software product can include the below-mentioned program and a storage medium on which the software is stored, or a medium for sending the program or software.

Note that the outline of the below-mentioned inventions does not intend to enumerate all the necessary features of the present invention, and a combination or sub-combination of these components can constitute an invention.

The present invention can be carried out in many different modes and should not be limited to the content of the embodiment. Note that not all the combinations of features described in the embodiment are requisites as resolving means of the present invention. The same components and elements will be given the same reference numbers throughout the description of the embodiment.

FIG. 1 is a functional block diagram of a data processing system 100 according to the embodiment of the present invention. Each component shown in the functional block diagram of FIG. 1 can be implemented such that, in an information processing apparatus having a hardware configuration illustrated in FIG. 11 to be described later, an operating system and a computer program such as authoring software stored in a hard disk drive 13, or the like, are loaded into a main memory 4 and read by a CPU 1 so that hardware resources and software will cooperate to work together.

The data processing system 100 according to the embodiment of the present invention includes, as respective components, an XML document storage section 105, an XML schema storage section 110, a coefficient generation section 115, a coefficient table 120, a subtree size calculating section 125, a subtree division generating section 130, an XML document processing section 135, and a processing history recording section 140.

The XML document storage section 105 and the XML schema storage section 110 according to the embodiment of the present invention store data on an XML schema and an XML document to be processed, respectively. The XML document is an electronic structured document according to a language created using the XML language as a metalanguage. The XML schema is a document describing the structure of the XML document. The content of the XML document must comply with the specifications of the XML language and the constraints defined in the XML schema applied.

In this specification, an example of the XML document and the XML schema will be described. However, it should be noted that those skilled in the art can prepare an XML document and an XML schema, appropriately, according to the specifications defined in the standards, such as Non-patent references 4, 5 and 6 (references 8, 9, 10).

The coefficient generation section 115, according to the embodiment of the present invention, can generate a coefficient and an element size that can be used to calculate an index value of an estimated element size for at least part of target elements of the XML schema. The coefficient generation section 115 can also generate and update coefficients based on information on processing history of XML documents in the past.

The coefficient and the element size generated by the coefficient generation section 115 are stored in the coefficient table 120. The details of the coefficient table 120 will be described later. The coefficient generation section 115 has at least a submodule or means for executing each step included in a flowchart 300 to be described later.

Using the coefficient generated by the coefficient generation section 115, the subtree size calculating section 125, according to the embodiment of the present invention, calculates an index value of the size of a subtree including, as the root, an element (described using <element> tag) as an XML schema element to be processed. The subtree size calculating section 125 has at least a submodule or means for executing each step, which are included in a flowchart 400 and a sub-routine 500 to be described later.

Based on the index value of the subtree size estimated by the subtree size calculating section 125, the subtree division generating section 130, according to the embodiment of the present invention, generates a division pattern for dividing the tree structure having XML schema elements as the roots into subtrees suited to parallel processing or distributed processing. The subtree division generating section 130 has at least a submodule or means for executing each step, which are included in the flowchart 400 and the sub-routine 500 to be described later.

The XML document processing section 135 according to the embodiment of the present invention processes the XML document. In the embodiment of the present invention, processing on the XML document by the XML document processing section 135 is performed by a multi-core processor having N processor cores (referred simply to as "cores" in this specification). A POWER® 7 processor having a maximum of eight cores and available from International Business Machines Corporation can be used for this multi-core processor.

At this time, a proper size of a subtree to be processed is assigned to each core using the division pattern generated by the subtree division generating section 130. The XML document processing section 135 has at least a submodule or means for executing each step included in a flowchart 600 to be described later.

The history recording section 140, according to the embodiment of the present invention, receives, from the XML document processing section 135, and stores information on processing history. The process history results from processing on the XML document by the XML document processing section 135.

In the embodiment of the present invention, the information on the processing history includes at least actual result values of variable portions of the XML schema, (such as the frequency of occurrence of a child element and the size of a text portion), that are actually processed. The information on the stored processing history is passed to the coefficient generation section 115, and it is used to update the coefficient and the element size stored in the coefficient table 120.

Figure 2:
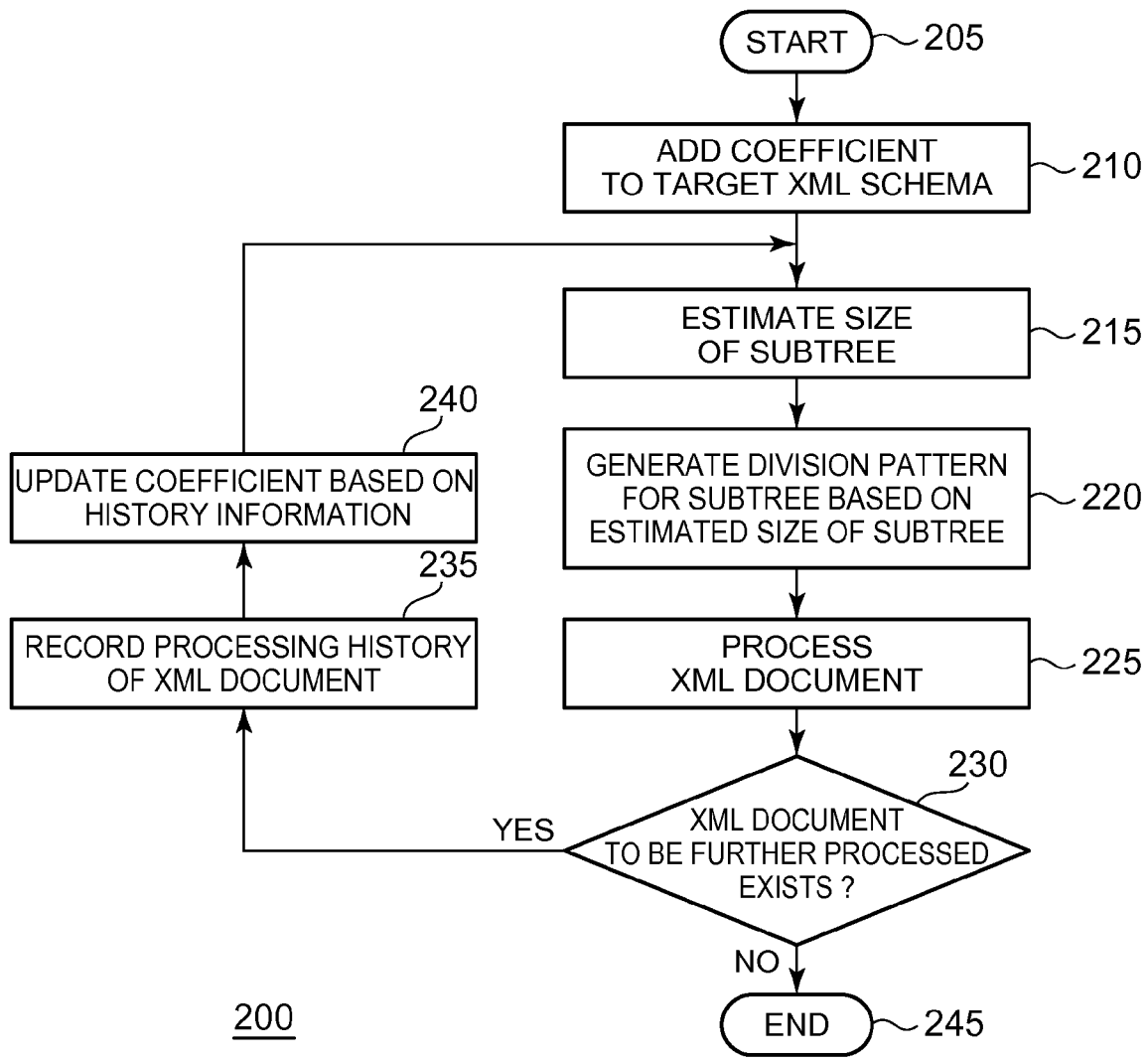
FIG. 2 is a flowchart representing the general operation of the data processing system according to the embodiment of the present invention.

FIG. 2 is a flowchart 200 representing the general operation of the data processing system according to the embodiment of the present invention. The processing starts at step 205, and in step 210, corresponding coefficient and element size of at lest part of target XML schema elements (defined using <element> tag) are created based on the description content of the schema. The generated coefficient and element size are stored in the coefficient table 120.

Next, in step 215, an index value of the size of a subtree having an element of the XML schema as the root is calculated using the coefficient and element size generated in step 210.

Then, the procedure proceeds to step 220 to generate a division pattern for dividing, based on the estimated index value of the subtree size, the tree structure into subtrees having respective elements as the roots as being suited to parallel processing.

Next, in step 225, the tree structure of the XML document is divided using the division pattern obtained in step 220 so that respective cores of the multi-core processor will perform parallel processing.

Then, the procedure proceeds to step 230 to determine whether any other XML document to which the XML schema is applied should be further processed. If it is determined in step 230 that the other XML document is to be processed, the procedure proceeds to step 235 through the arrow of YES to record the information on the processing history obtained from the processing on the XML document already performed in step 225. As mentioned above, in the embodiment of the present invention, the information on the processing history includes at least actual result values of variable portions of the XML schema (such as the frequency of occurrence of a child element and the size of a text portion) actually processed.

Next, the procedure proceeds to step 240 to update the coefficient and element size based on the information on the processing history stored, and after that, processing step 210 and beyond is repeated using the updated coefficient and element size. If it is determined in step 230 that any XML document is not further processed, the procedure proceeds to step 245 through the arrow of NO to end the processing.

Figure 3:
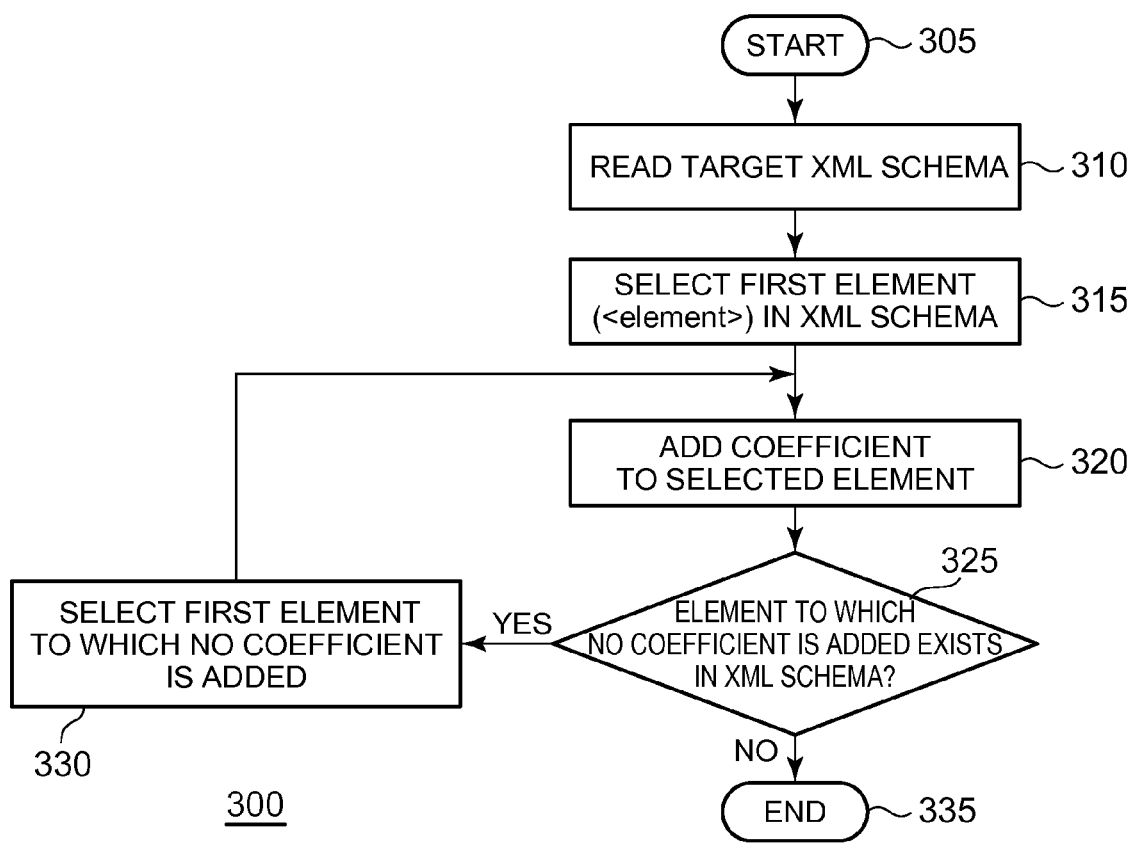
FIG. 3 is a flowchart representing the operation of the data processing system to add a coefficient in the embodiment of the present invention.

FIG. 3 is the flowchart 300 representing the operation of the data processing system to add a coefficient in the embodiment of the present invention. This operation corresponds to step 210 in the flowchart 200. The processing starts at step 305, and in step 310, the target XML schema is read.

The following will describe an example of the XML schema to be read in step 310 in the embodiment of the present invention.

FIG. 8 shows an example of the XML schema in the embodiment of the present invention. In XML schema 800, the structure of an element whose name is "Root" (which is declared using <element> tag, and referred to as "Root" element below) is defined.

A portion 805 in the XML schema is the declaration of the "Root" element. A portion 810 defines the structure of the uppermost hierarchy of the "Root" element. In this example, the occurrence of child elements "C" (815), "A" (820), and "B" (825) in the "Root" element, in this order, is described.

To be more specific, the portion 815 describes that the child element "C" occurs one or more times (it is assumed that it occurs once when there is no definition of minOccurs (the minimum number of occurrences) or infinite times (the infinite number of occurrences is allowed when maxOccurs (the maximum number occurrences) is "unbounded"). It is also describes that the child element "C" has a lower element (referred to as grandchild element for convenience) (type="tns:C").

The portion 820 describes that the child element "A" occurs once (no definition of minOccurs and maxOccurs) with a character string described and without lower hierarchy (type="xsd:string").

The portion 825 describes that the child element "B" occurs not less than zero times and not more than once (minOccurs="0" and no definition of maxOccurs) with a character string described and without lower hierarchy (type="xsd:string").

A portion 830 defines the structure of the uppermost hierarchy of the "C" element. In this example, the occurrence of a child element "C1" (835) happens infinite times more than once, and it is described in the "Root" element with an integer described, and without lower hierarchy.

Since the "Root" element is declared using <element> tag as an independent element in the schema 800, it can occur independently in the XML document. On the other hand, since the elements "A," "B," "C," and "C1" are declared as child elements of another element, they cannot be used independently in the XML document, and are allowed to occur only as the child elements of the other element described in the XML schema.

Returning to the flowchart 300 in FIG. 3, an element (specified in <element> tag) that occurs first in the XML schema is selected in step 315. Next, in step 320, a coefficient and an element size are calculated and assigned to the selected element. The element size is an index value of the size of the element by taking only the hierarchy of the element into account without taking, into account, lower elements (including child elements) called by the element concerned. In step 320, it is considered that the coefficient and the element size can be assigned according to various techniques.

In the embodiment of the present invention, it is assumed that the coefficient and the element size are assigned according to the following rules. In the embodiment of the present invention, the assigned coefficient and element size are stored in the coefficient table, which will be described later.

Rule 1: The element size of an element defined in <element> tag is set as e. The size of a text portion, the data type of which is "xsd:string", is set as 2e. The size of a text portion of a simple type, other than the data type of xsd:string, is set as 0.5e.

Rule 2: The coefficient of an element defined in <element> tag is set to a fixed value when the number of occurrences of the element is the fixed value. For example, since the number of occurrences of an element without definition of minOccurs (the minimum number of occurrences of the element) and maxOccurs (the maximum number of occurrences of the element) is once, the coefficient is 1.

Rule 3: The coefficient of an element whose number of occurrences defined by minOccurs and maxOccurs varies within a range, and takes an intermediate value within the range of variation in the number of occurrences of the element.

Rule 4: The coefficient of an element with maxOccurs="unbounded" (representing that the maximum number of occurrences of the element is not limited) is set to 3.

Alternatively, the value e can be decided based on an average size of element names that appear in the XML schema, and the decided value e can be substituted. For example, the value e can be set as (average size of element names)*2+5. The average size of element names can be calculated based on the processing history of the XML document, but when there is no processing history, a default value can be substituted.

Then the procedure proceeds to step 325 to determine whether any element to which no coefficient and element size are assigned yet exists in the target XML schema. If it is determined in step 325 that any element exists, the procedure proceeds to step 330 through the arrow of YES to select the first one of elements to which no coefficient and element size are assigned yet. Then the procedure returns to step 320 to assign a coefficient to the selected element. If it is determined in step 325 that no element exists, the procedure proceeds to step 335 through the arrow of NO to end the processing.

The coefficient and element size generated according to the flowchart 300 are stored in the coefficient table. FIG. 9 shows an example of the coefficient table generated for the XML schema 800 in the embodiment of the present invention. In this case, note that the coefficient and the element size are stored in association with the element name. FIG. 10 shows another example of the coefficient table generated for the XML schema 800 in the embodiment of the present invention. In this case, note that the coefficient and the element size are stored in association with the absolute path (XPath expression) of each element. Use of the coefficient table using absolute paths enables each element for which the feedback is repeated using the information on the processing history to be processed, respectively. As a result, since each of the elements repeated can have a different coefficient and element size, a division pattern can be formed more accurately.

Figure 4:
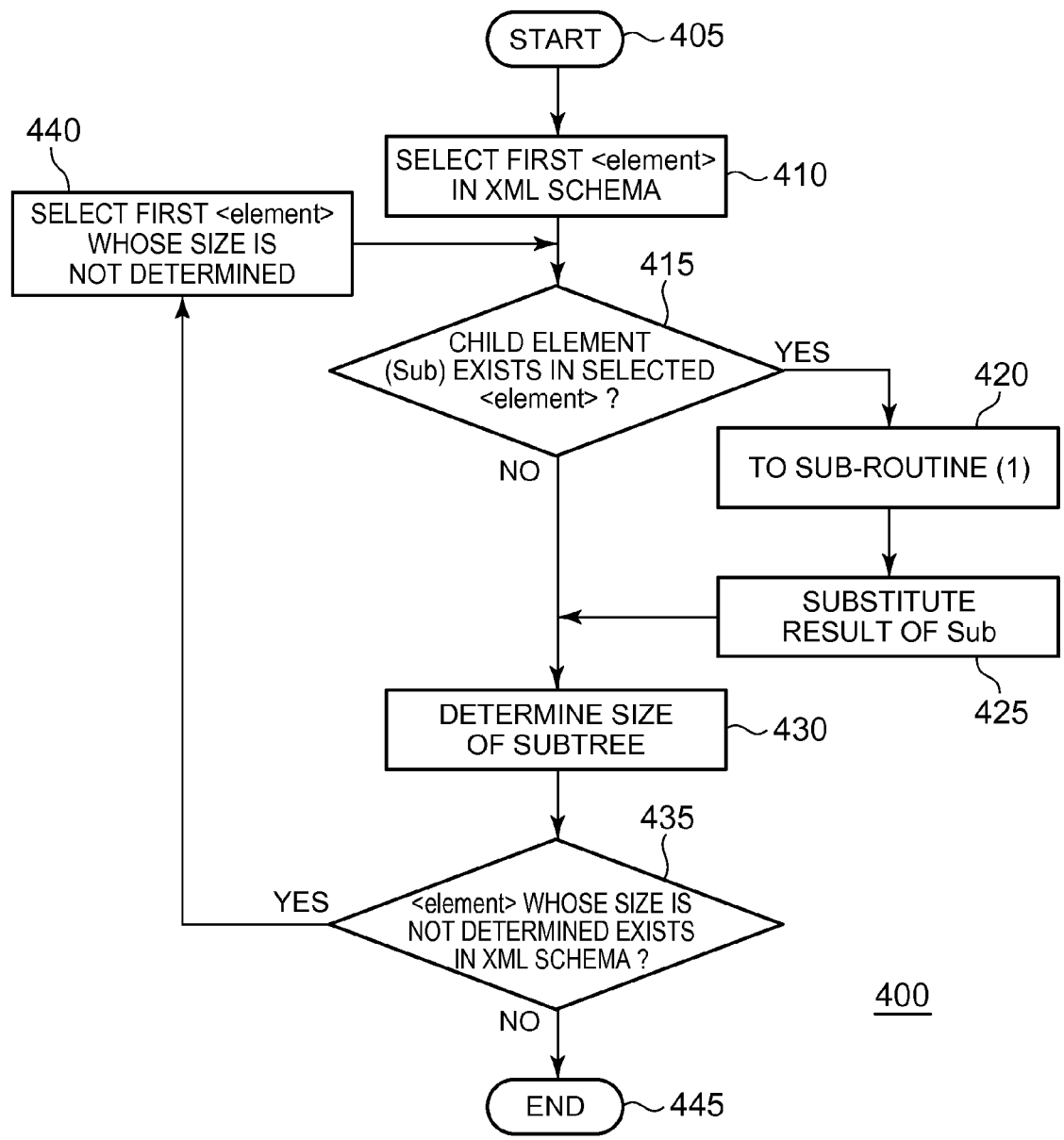
FIG. 4 is a flowchart representing the operation of the data processing system to estimate the size of a subtree in the embodiment of the present invention.
Figure 5:
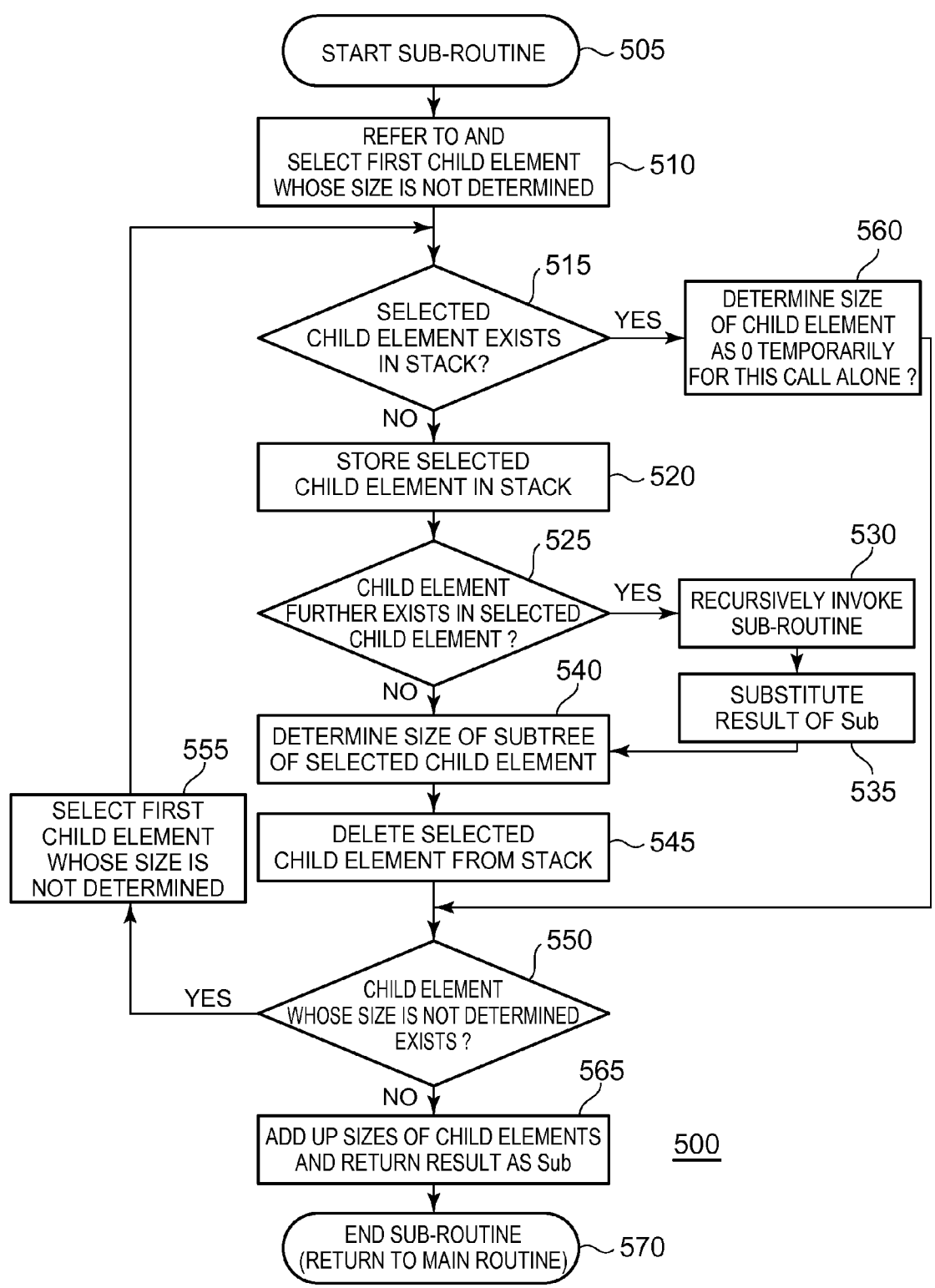
FIG. 5 is a flowchart representing a sub-routine in the operation of the data processing system to estimate the size of a subtree in the embodiment of the present invention.

FIG. 4 is a flowchart 400 representing the operation of the data processing system to estimate the size of a subtree in the embodiment of the present invention. This operation corresponds to step 215 in the flowchart 200. The processing starts at step 405, and in step 410, the first element in the target XML schema is selected. Then the procedure proceeds to step 415 to determine whether any child element exists in the selected element. If it is determined in step 415 that any child element exists, the procedure proceeds to step 420 to execute the sub-routine 500. Referring to FIG. 5, the sub-routine 500 will be described.

FIG. 5 is a flowchart representing the sub-routine 500 in the operation of the data processing system to estimate the size of a subtree in the embodiment of the present invention. The processing starts at step 505, and in step 510, the first one of child elements whose size is not determined in the target XML element is selected. Next, in step 515, it is determined whether the selected child element exists in a stack.

If it is determined in step 515 that it exists, the procedure proceeds to step 560 through the arrow of YES to determine the size of the selected child element to be 0 temporarily for this call alone. This is to deal with a case where the size is not determined because the same child element recursively exists. After that, the procedure proceeds to step 550.

If it is determined in step 515 that it does not exist, the procedure proceeds to step 520 through the arrow of NO to store the selected child element in the stack.

Next, in step 525, it is determined whether any lower element (called "grandchild element" for convenience) exists in the selected child element. If it is determined in step 525 that any grandchild element exists, the sub-routine 500 is recursively invoked to substitute the size of the resulting grandchild element. After that, the procedure proceeds to step 540.

If it is determined in step 525 that no grandchild element exists, the procedure proceeds to step 540 through the arrow of NO. In step 540, the sum of the size of the grandchild element and the size of the selected child element itself is calculated to determine the size of the subtree of the selected child element. Next, in step 545, the selected child element is deleted from the stack, and it is then determined in step 550 whether any other child element whose size is not determined exists in the target element.

If it is determined in step 550 that any other child element exists, the procedure proceeds to step 555 through the arrow of YES to select any other child element whose size is not determined. Then the procedure returns to step 515 to process the selected child element in the same way. If it is determined in step 550 that any other child element does not exist, the procedure proceeds to step 565 through the arrow of NO to add up the sizes of the child elements and return the result as the minimum element size in the sub-routine. Then, the procedure proceeds to step 570 to end the sub-routine 500.

Returning to FIG. 4, after the sub-routine 500 is executed in step 420, the value of the child element size that is returned from the sub-routine 500 is substituted in step 425. Then, the procedure returns to step 430 to calculate the sum of the child element size and the size of the selected element itself. This is done in order to determine the size of the subtree having the selected element as the root.

Next, in step 435, it is determined whether any other element whose size is not determined exists in the XML schema. If it is determined in step 435 that any other element exists, the procedure proceeds to step 440 through the arrow of YES to select an element whose size is not determined. Then, the same processing in step 415 and beyond is performed on the selected element. If it is determined in step 435 that any other element does not exist, the procedure proceeds to step 445 through the arrow of NO to end the processing.

In the embodiment of the present invention, when the schema 800 is processed according to the above-mentioned flowchart 400, the index values of the sizes of subtrees, which have the elements "Root," "A," "B," "C," and "C1" as their roots, are 22e, 3e, 3e, 5.5e, and 1.5e, respectively.

Figure 6:
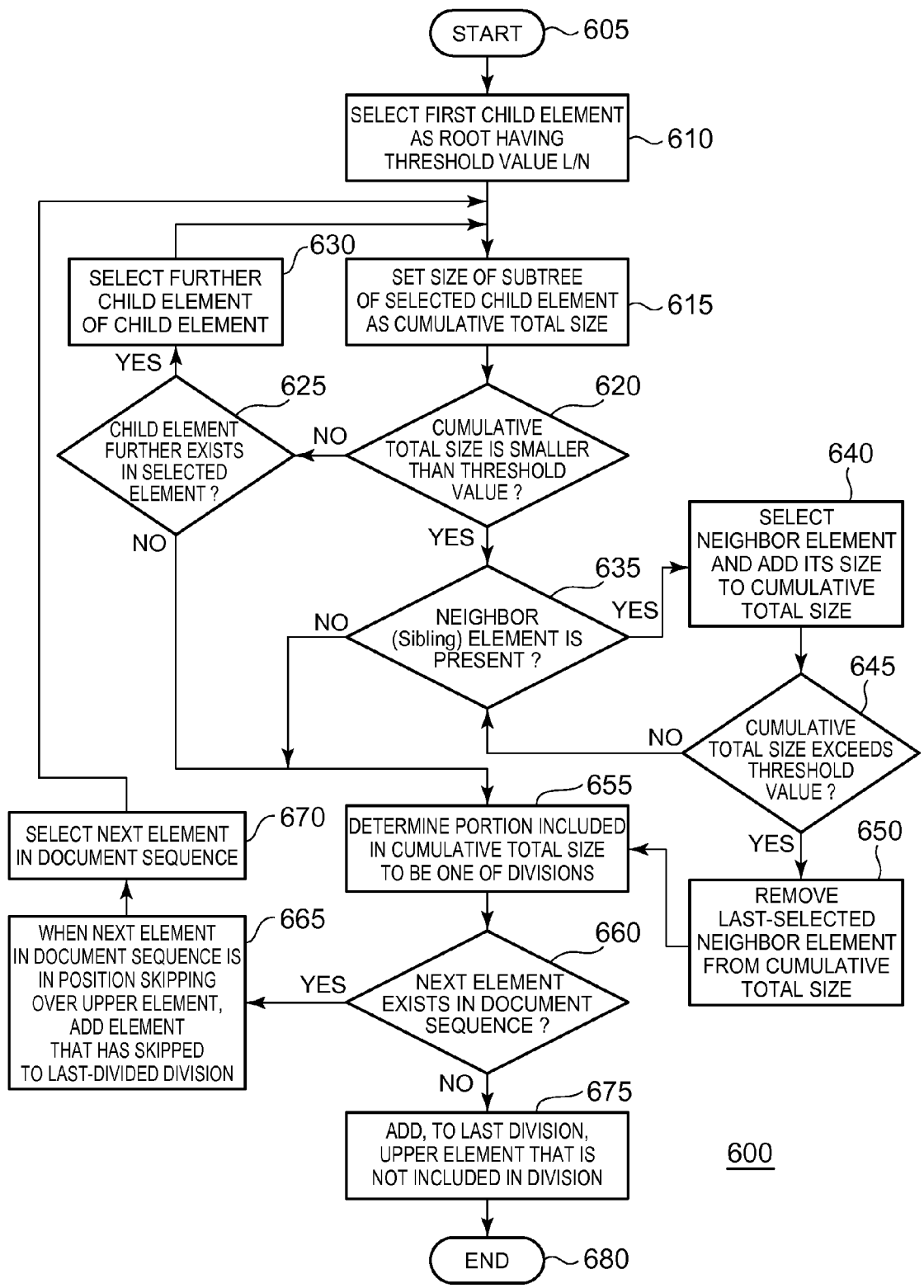
FIG. 6 is a flowchart representing the operation of the data processing system to generate a division pattern in the embodiment of the present invention.

FIG. 6 is the flowchart 600 representing the operation of the data processing system to generate a division pattern in the embodiment of the present invention. In the embodiment of the present invention, when the tree structure of the XML document is divided into N blocks, (where N is the number of cores in the multi-core processor as processor units operable in parallel to process subtrees of the XML document), a division pattern is generated such that the sizes of the subtrees after being divided are almost equal. This operation corresponds to step 220 in the flowchart 200.

The processing starts at step 605, and in step 610, the first child element is selected and put in a division group. Next, in step 615, the size of the subtree of the selected child element is set as the total size of the division group.

Then, the procedure proceeds to step 620 to determine whether the total size of the division group set in step 615 is smaller than a threshold value (L/N) obtained by dividing the total element size (L) by the number (N) of subtrees into which the tree structure should be divided. For example, N can be set as the number of processors (or cores) that perform parallel processing on the subtrees of the XML document to call the schema.

If it is determined in step 620 that the total size is not smaller, the procedure proceeds to step 625 through the arrow of NO to determine whether any lower element (called a grandchild element) exists in the selected child element. If it is determined in step 625 that any grandchild element exists, the procedure proceeds to step 630 through the arrow of YES to remove the child element from the division group, and select and put a grandchild element in the division group instead. After that, the procedure returns to step 615. If it is determined in step 625 that no grandchild element exists, the procedure proceeds to step 655 through the arrow of NO.

If it is determined in step 620 that the total size is smaller, the procedure proceeds to step 635 to determine whether any other element exists in the same hierarchy. If it is determined in step 635 that any other element dose not exist in the same hierarchy, the procedure proceeds to step 655 through the arrow of NO. On the other hand, if it is determined in step 635 that any other element exists in the same hierarchy, the procedure proceeds to step 640 through the arrow of YES to select the element in the same hierarchy, add it to the division group, and add up the total size.

Next, in step 645, it is determined whether the total size exceeds the threshold value (L/N). If it is determined in step 645 that the total size does not exceeds the threshold value, the procedure returns to step 635 through the arrow of NO to perform the same processing on the presence or absence of still another element in the same hierarchy. If it is determined in step 645 that the total size exceeds the threshold value, the procedure proceeds to step 650 through the arrow of YES to remove the last-selected element. Then the procedure proceeds to step 655.

In step 655, the division group at the time is determined to be one of division groups included in the division pattern to be outputted. Then, the procedure proceeds to step 660 to determine whether the next element exists in a document sequence. If it is determined in step 660 that the next element exists, the procedure proceeds to step 665 through the arrow of YES. In step 665, if the next element in the document sequence is in a position skipping over an upper element, the element that has skipped is added to the last-added division group. Then the procedure proceeds to step 670 to select the next element in the document sequence. After that, the procedure returns to step 610 to repeat the same processing.

If it is determined in step 660 that the next element does not exist, the procedure proceeds to step 675 through the arrow of NO to add the upper element that is not included in the division group to the last-processed division group. After that, the procedure proceeds to step 680 to end the processing. It will be understood that the division pattern of the target elements can be obtained through the processing.

In the embodiment of the present invention, if it is assumed that the number (N) of subtrees to be divided, in order to process the schema 800, is four, and since the size (L) of the "Root" element is 22e, the threshold value (L/N) is 5.5e. When the schema 800 is divided according to the above-mentioned flowchart 600, a division pattern consisting of four division groups of one division group (size: 5.5e) of the elements "Root," "A," and "B," and three division groups (size: 5.5e) of the elements "C" and "C1" is obtained.

Figure 7:
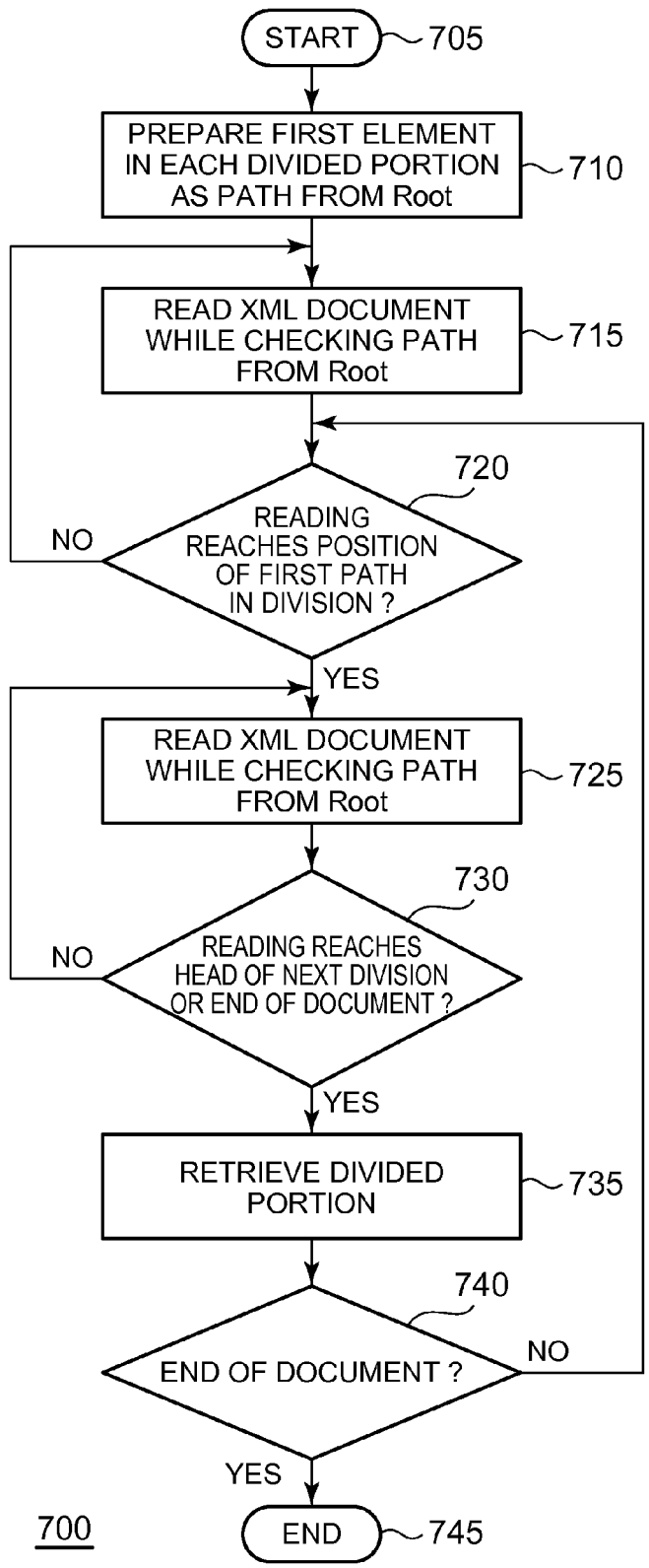
FIG. 7 is a flowchart representing the operation of the data processing system to process an XML document in the embodiment of the present invention.

FIG. 7 is a flowchart 700 representing the operation of the data processing system to process the XML document in the embodiment of the present invention. This operation corresponds to step 225 in the flowchart 200. In processing of the flowchart 700, the division pattern already obtained for the XML document is applied to divide the tree structure appropriately in order to perform parallel processing effectively. The processing starts at step 705, and in step 710, the first element in each divided portion is prepared as a path from the root element, respectively. Next, in step 715, the reading of the target XML document is started in order to read the XML document while checking the paths from the root element.

Next, in step 720, it is determined whether the reading reaches the position of the first path in the division. If it is determined in step 720 that it does not reach, the procedure returns to step 715 through the arrow of NO to continue to read the XML document. If it is determined in step 720 that it reaches, the procedure proceeds to step 725 through the arrow of YES to read the XML document while checking the paths from the root element.

Then, the procedure proceeds to step 730 to determine whether the reading reaches the head of the next division or the end of the document. If it is determined in step 730 that it does not reach, the procedure proceeds to step 725 through the arrow of NO to continue the reading of the XML document. If it is determined in step 730 that it reaches, the procedure proceeds to step 735 through the arrow of YES to retrieve the divided portion.

Next, the procedure proceeds to step 740 to determine whether it is the end of the document or not. If it is not the end of the document, the procedure returns to step 720 to repeat the same processing; while if it is the end of the document, the procedure proceeds to step 745 to end the processing.

In the embodiment of the present invention, information on the history of processing in the flowchart 700 is stored in the history storage section, and based on this history information, the coefficients and element sizes in the coefficient table are updated. This processing corresponds to steps 235 and 240 in the flowchart 200. This technique is effective because it is considered that XML documents that conform to the XML schema have many similarities in tree structure, data size, etc. This history information can be obtained using XML documents to be actually processed or by giving typical XML documents beforehand.

As already mentioned above, in the embodiment of the present invention, the information on the processing history includes at least an actual value of an XML schema variable portion (the frequency of occurrence of a child element, the size of text portions, etc.) in XML documents actually processed. Specifically, in the embodiment of the present invention, at least the following information is recorded as history, and the coefficient and element size are updated:

(1) Frequency of occurrence of an element in an actual XML document when the frequency of the number of occurrences of the element varies. For example, when there is history indicating that 90 percent of the element with "minOccurs=0" occurs, the coefficient of the element is updated to 0.9. Further, for example, when there is history indicating that an element with "maxOccurs="unbounded"" occurs ten times in the actual XML document, the coefficient is updated to 10.

(2) Actual size of a text portion. From this history, an average of the sizes of text portions is calculated to decide on an index value of the size of a text portion in the XML schema.

(3) Actual size of an element name. From an average of the sizes of actually appearing element names, an index value of the size of an element name is decided.

Further, based on the information on the processing history, at least part of coefficients can take two or more values. For example, when there is processing history indicating that an element with "maxOccurs="unbounded"" occurs mostly three times and seven times, it is considered that different coefficients are set for respective cases. Then, depending on the number of occurrences of the element in XML documents to be processed later, the types of structured documents or elements are classified such that either of the coefficients can be applied. This enables more accurate divisions.

Although the embodiment of the present invention has been described using an example of the XML schema, the details of the XML language and the specifications of the XML schema language are described in Non-patent references 4, 5 and 6 (references 8, 9, 10), and are well known to those skilled in the art. Therefore, those skilled in the art who read this specification can make additions to, or changes, in the content to create variations; and as a result, a further detailed description will be omitted.

Figure 11:
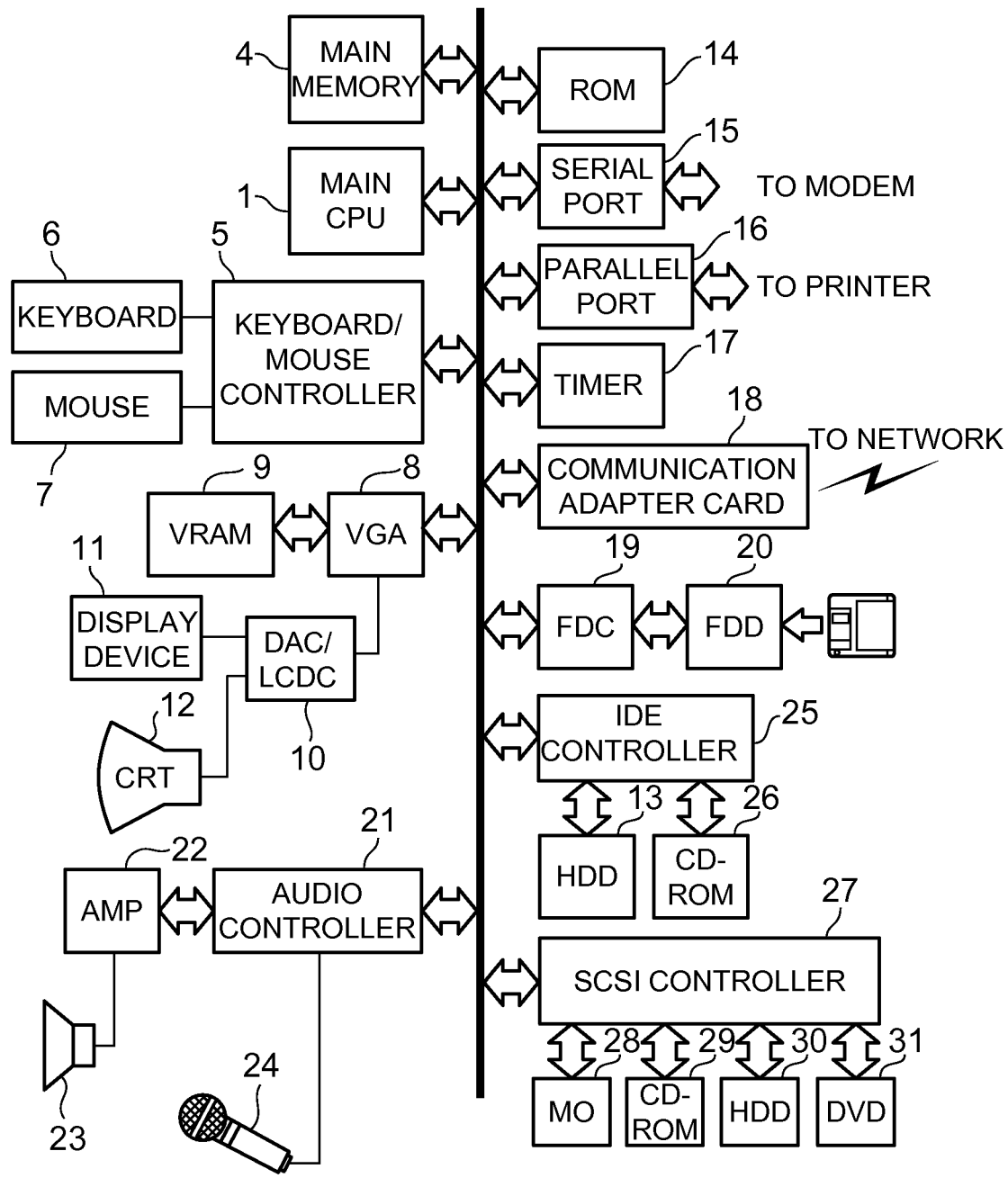
FIG. 11 is a block diagram showing an example of the hardware configuration of an information processing apparatus suited to implement the data processing system according to the embodiment of the present invention.

FIG. 11 is a block diagram showing an example of the hardware configuration of an information processing apparatus suited to implement the data processing system 100 according to the embodiment of the present invention. The information processing apparatus includes a CPU (central processing unit) 1 and a main memory 4 connected to a bus 2, respectively. It is assumed that the CPU 1 in the embodiment of the present invention is a multi-core processor. It is also assumed that each portion divided in an XML document is sent to each core of the CPU 1 to perform parallel processing.

Hard disk drives 13 and 30 and removable storages (external storage systems capable of changing recording media) such as CD-ROM devices 26 and 29, a flexible disk unit 20, an MO drive 28, and a DVD drive 31, are also connected to the bus 2 via a floppy disk controller 19, an IDE controller 25, a SCSI controller 27, and the like.

Storage media such as flexible disk, MO, CD-ROM or DVD-ROM are inserted into the removable storages. Computer program code that cooperates with the operating system to give instructions to the CPU, and the like, to carry out the present invention can be recorded on these storage media or in the hard disk drive 13, or the ROM 14, and loaded into the main memory 4 to run the computer program. The computer program can be compressed or divided into plural pieces and recorded on plural media.

The information processing apparatus receives input from input devices such as a keyboard 6 and a mouse 7 via a keyboard/mouse controller 5. The information processing apparatus is connected to a display device 11 via a DAC/LCDC 10 to present visual data to a user.

The information processing apparatus is connected to a network through a network adapter 18 (Ethernet® card or token ring card) so that it can communicate with other computers and the like. Though not shown, the information processing apparatus can be connected to a printer through a parallel port or to a modem through a serial port.

As described above, it will be easily understood that the information processing apparatus suited to implement the data processing system according to the embodiment of the present invention is an information processing apparatus such as a normal personal computer, workstation, mainframe computer or the like, and it can be implemented by a combination of them. Note that these components are illustrative examples, and not all the components are essential components of the present invention.

Of course, various changes can be easily made by those skilled in the art, such as to combine two or more machines and allocate functions to realize respective hardware components of the information processing apparatus used in the embodiment of the present invention. As a matter of course, these changes are ideas included in the spirit of the present invention.

The data processing system of the embodiment of the present invention employs Windows® operating system available from Microsoft Corp., Mac OS® available from Apple Computer Inc., or an operating system that supports a GUI (Graphical User Interface) multi-window environment, such as a UNIX® system including a X Window System (e.g., AIX® available from International Business Machines Corporation).

Thus, it can be understood that the data processing system used in the embodiment of the present invention is not limited to a specific multi-window operating system environment.

As described above, according to the embodiment of the present invention, and in addition to other features disclosed above, a system, a software, and method for effectively dividing a tree structure of an XML document as a structured document is provided. In the embodiment of the present invention, a division pattern is obtained from the XML schema. After that, the XML document is divided according to the division pattern so that multiple cores of a multi-core processor will perform parallel processing. Thus, it can be easily understood that the XML document can be processed efficiently and properly.

The present invention can be implemented in hardware, software, or a combination of hardware and software. As a typical example of the implementation in a combination of hardware and software, there is an implementation in a data processing system having a predetermined program. In such a case, the predetermined program is loaded into the data processing system and run so that the program will control the data processing system to perform processing according to the present invention. This program consists of a set of instructions capable of being written in any language, code, or notation. Such a set of instructions enables the system to execute specific functions directly or after performing either or both of the following: 1) conversion to another language, code, notation and 2) copy to another medium.

Of course, such a program itself, and a medium with the program recorded thereon, are included in the scope of the present invention. The program for executing the functions of the present invention can be stored on any computer-readable recording medium, such as flexible disk, MO, CD-ROM, DVD, hard disk drive, ROM, MRAM, and RAM. The program can be downloaded from another data processing system connected through a communication line or copied from another recording medium to store the program onto the recording medium. Further, the program can be compressed or divided into plural pieces to store the program onto a single or plural recording media. Note that the program product for carrying out the present invention can, of course, be provided in various forms.

It will be readily apparent to those skilled in the art that various changes or modifications can be made to the aforementioned embodiment. For example, the embodiment of the present invention is described using parallel processing performed by the cores of a multi-core processor, but parallel processing for divided subtrees can be performed by separate processors. Further, in the embodiment of the present invention, the XML language, the XML document that conforms to the XML Schema, and the XML schema are used; but a structured document that conforms to any other metalanguage such as SGML, HTML or XHTML, DTD, and a schema file that conforms to a schema language such as RELAX, RELAX NG, NVDL, or Schematron can be used. As a matter of course, the forms to which such changes or modifications are made are included in the technical scope of the present invention.

What is claimed is:

1. A computer-implemented method for dividing a tree structure of a structured document based on a tree structure defined by a schema of said structured document, said method comprising the steps of:

calculating an index value of a size of a subtree with at least one element being defined as a root element for at least part of at least one other element included in said tree structure defined by said schema wherein said index value is calculated based on a comparison of element sizes determined from information on processing history; and deciding on a division pattern using said index value, wherein said division pattern is used to divide said tree structure of said structured document to which said schema is applied so that said size of said subtree, after being divided, meets a predetermined standard.

2. The method according to claim 1, further comprising the step of assigning coefficients to at least one element included in said tree structure defined by said schema so that said index value of said subtree having each element as said root is calculated using said coefficients.

3. The method according to claim 2, wherein at least part of said coefficients is calculated based on the information on processing history of structured documents to which said schema is applied.

4. The method according to claim 3, wherein said information on said processing history is information on a variable portion of said schema of said processed structured documents.

5. The method according to claim 4, wherein said variable portion of said schema is selected from the group consisting of: (i) frequency of occurrence of a child element, (ii) size of a text portion, and (iii) frequency of occurrence of a child element and size of a text portion.

6. The method according to claim 3, wherein at least two values are set for at least part of said coefficients based on said information on processing history, and at least one of said coefficient values is applied on a structured document to be processed.

7. The method according to claim 3, wherein said information on said processing history is generated by processing typical structured documents prepared in advance.

8. The method according to claim 2, wherein at least part of said coefficients is calculated based on a description content of said schema.

9. The method according to claim 2, wherein at least part of said coefficients is decided based on a size of an element name included in said schema.

10. The method according to claim 2, wherein at least part of said coefficients is stored in association with an element name of a corresponding element.

11. The method according to claim 2, wherein at least part of said coefficients is recorded in association with an absolute path of a corresponding element.

12. The method according to claim 1, wherein said index value of said size of said subtree having each element as the root is calculated by accounting for processing history of structured documents to which said schema is applied.

13. The method according to claim 1, wherein said calculating step further comprises:
    determining existence of a child element of a calculation target element;
    calculating size of said child element, when said child element exists, and
    calculating a sum of said size of said child element and a size of said calculation target element.

14. The method according to claim 1, wherein said deciding step further comprises deciding on a division pattern that permits dividing subtrees of said tree structure of said structured document such that sizes of said subtrees are substantially equal after said division.

15. The method according to claim 1, wherein said deciding step further comprises deciding on a division pattern for dividing said tree structure of said structured document in a manner that corresponds to a number of processor units operable in parallel, wherein said processor units are used to process subtrees of said structured document.

16. The method according to claim 15, wherein said processor units are cores of a multi-core processor in a data processing system.

17. The method according to claim 1, wherein said structured document conforms to a metalanguage format selected from the group consisting of: (i) SGML, (ii) XML, (iii) HTML, and (iv) XHTML.

18. The method according to claim 1, wherein said schema conforms to a schema language format selected from the group consisting of: (i) XML Schema, (ii) DTD, (iii) RELAX, (iv) RELAX NG, (v) NVDL, and (vi) Schematron.

19. A computer readable storage medium tangibly embodying a computer readable program code having computer readable instructions which, when implemented, cause a computer to carry out the steps of the method according to claim 1.

20. A system for dividing a tree structure of a structured document based on a tree structure defined by a schema of said electronic structured document, the system comprising:
    a calculation section for calculating, using a processor, an index value of a size of a subtree with at least one element being defined as a root element for at least part of at least one other element included in said tree structure defined by said schema wherein said index value is calculated based on a comparison of element sizes determined from information on processing history; and
    a decision section for deciding on a division pattern using said index value, wherein said division pattern is used to divide said tree structure of said structured document to which said schema is applied so that said size of said subtree, after being divided, meets a predetermined standard.

* * * * *